United States Patent [19]
Horadan et al.

[11] Patent Number: 6,029,147
[45] Date of Patent: *Feb. 22, 2000

[54] METHOD AND SYSTEM FOR PROVIDING AN INTERFACE FOR SUPPORTING MULTIPLE FORMATS FOR ON-LINE BANKING SERVICES

[75] Inventors: Peter H. Horadan, Kirland; Richard A. Vaughan; Vivian Sewelson, both of Seattle; Timothy J. Johnstone, Snohomish, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,203

[22] Filed: Mar. 14, 1997

Related U.S. Application Data

[60] Provisional application No. 60/013,482, Mar. 15, 1996.
[51] Int. Cl.[7] ................................................ G06F 17/60
[52] U.S. Cl. .............................. 705/35; 705/1; 705/27; 709/232; 235/379
[58] Field of Search .................................. 707/1, 27, 35; 380/52; 235/379; 709/232

[56] References Cited

U.S. PATENT DOCUMENTS

| | | | |
|---|---|---|---|
| 5,218,631 | 6/1993 | Katz | 463/41 |
| 5,326,959 | 7/1994 | Perazza | 235/379 |
| 5,706,442 | 1/1998 | Anderson et al. | 707/27 |
| 5,802,307 | 9/1998 | Melo | 395/200.62 |
| 5,815,577 | 9/1998 | Clark | 380/52 |

FOREIGN PATENT DOCUMENTS 0804030 10/1997 United Kingdom ............. H04N 7/14

OTHER PUBLICATIONS

Intranets & the 'Net, Network World, Jan. 27, 1997.
Microsoft: Microsoft announces availability of active statement technology for Microsoft Money, M2 Presswire, Nov. 20, 1996.
Microsoft Realeases Money 97, Unveils List Of OFC Partners., Information & Interactive Report. V.17, No. 35, Oct. 4, 1996.
Bank uses windows application program on network to improve productivity. Networks Update V.3 No. 10, Oct. 1991.
Client/server tools revive CASE. Ricciuti, Mike, Datamation V39, No. 7, p.38(5) Apr. 1, 1993.

*Primary Examiner*—Allen R. MacDonald
*Assistant Examiner*—M. Irshadullah
*Attorney, Agent, or Firm*—Jones & Askew, LLP

[57] ABSTRACT

In association with a computer system, a method and system for providing an interface for establishing connections with financial institution to utilize on-line services. An application program sends a request to a branding server to look up information related to a particular financial institution. The branding server executes the request and, if the branding server contains information relating to the method of connection with identified financial institution, the branding server sends the information to the application program. The application program then loads an appropriate driver corresponding to the method of connection as determined by the branding server. If the method of connection is open financial connectivity (OFC), then the application loads a flexible driver (the OFC driver) which causes the application program to request the business rules of the particular financial institution from the financial institution's server. The bank server then transmits the business rules to the OFC driver which incorporates the business rules into the application program software and reconfigures the application program to operate according to the business rules.

33 Claims, 4 Drawing Sheets

METHOD AND SYSTEM FOR PROVIDING AN INTERFACE FOR SUPPORTING MULTIPLE FORMATS FOR ON-LINE BANKING SERVICES

CROSS-REFERENCE TO RELATED APPLICATION

This application claims the benefit of U.S. Provisional Application Ser. No. 60/013,482 filed Mar. 15, 1996.

TECHNICAL FIELD

The present invention relates generally to on-line services and, more specifically, to an interface for an application program that supports multiple formats for on-line banking services.

BACKGROUND OF THE INVENTION

The increasing use of wide area networks such as the Internet has resulted in the availability of many on-line services. Computer users can access many services by utilizing a wide area network to establish a connection with other computers connected to the network.

The Internet, which represents a distributed computer network, is a worldwide network of computers belonging to various entities such as corporations, institutes of learning, and research organizations. The computers are connected by gateways that handle data transfer and conversion of messages from a sending network to the protocols used by a receiving network. The Internet is a collection of networks and gateways that use the TCP/IP suite of protocols. TCP/IP is an acronym for Transport Control Protocol/Interface Program, a software protocol developed by the Department of Defense for communications between computers.

Typically, the computers connected to a wide area network such as the Internet are identified as either servers or clients. A server is a computer that stores files that are available to other computers connected to the network. A client is a computer connected to the network that accesses shared resources provided by a server. To obtain information from a server, a client makes a request for a file or information located on the server using a specified protocol. Upon reception of a properly formatted request, the server downloads the file to the client.

The world wide web is a specific Internet network using specified Internet protocols. As is well known to those skilled in the art, communications between computers on the world wide web use the HTTP protocol. Files on a web server are identified by a universal resource locator (URL). A URL is a format for describing files on a server and describes both the name of the server and the path to the file on the server. For example, a URL for a web server may be constructed as follows: "http://<server>/<filepath>", where <server> identifies the server on which the file is located and <filepath> identifies the path to the file on the server. By knowing the name of the server and the correct file path to a file, a properly formatted URL can be created to allow a user to access any desired file on a server connected to the world wide web.

In connection with wide area networks such as the Internet, application programs are available for client computers to support specific types of on-line services. For example, there are a number of commercially available application programs that support on-line banking services between financial institutions and their customers. These services may include on-line bill payment capabilities that enable a user to write electronic checks and to send them to a processor for payment. The on-line services may also include on-line banking that enables a user to download account information such as balances, statements, to transfer funds between accounts, and apply for personal and secured loans.

Personal finance application programs allow a user to establish a connection between the user's computer (the client) and a computer at any of a large number of financial institutions that support on-line services. There are many different ways to establish a connection between the user's computer and the financial institution, and each individual financial institution determines the method by which a user may establish a connection. However, not all financial institutions permit these connections or support on-line services. Typical application programs obtain information regarding the identity of the financial institutions that support on-line services as well as the connection method required by each financial institution in various ways, as is discussed further below.

Service providers for establishing connections with financial institutions currently exist, such as Intuit Services Corporation (ISC) and Visa Interactive. These two service providers have their own protocols and a personal finance application program that utilizes one of these service providers must include a driver that allows the application program to connect to and utilize the service provider. A personal finance application program may also include a driver that allows the application program to connect to and utilize another service provider, such as BTX or Minitel. BTX and Minitel are service providers for institutions in Germany and France, respectively.

Figure 1A:
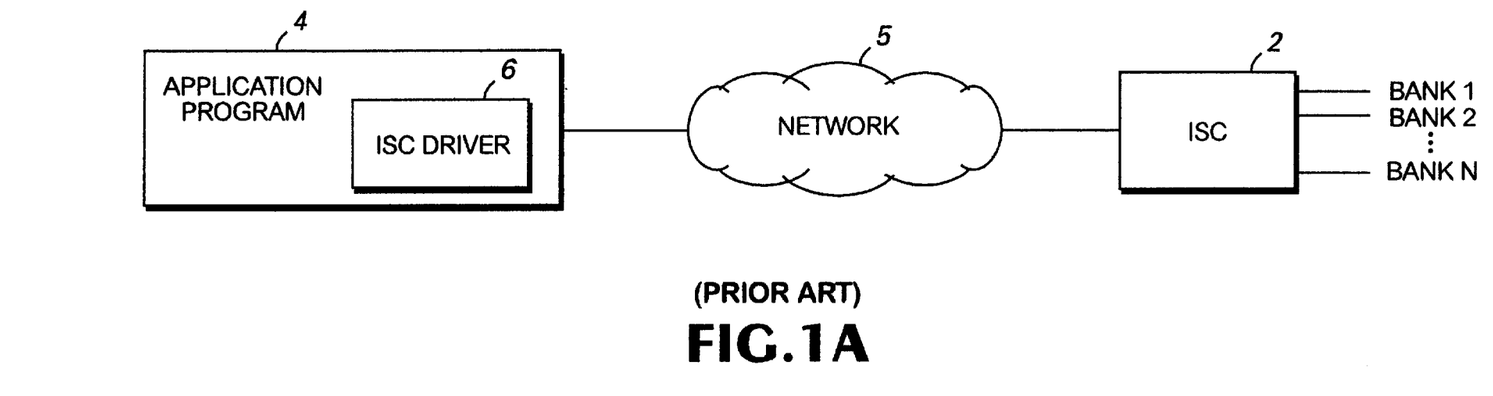
FIGS. 1A and 1B are block diagrams of prior methods of connecting an application program to a service provider for connecting to financial institutions for utilizing on-line banking services.
Figure 1B:
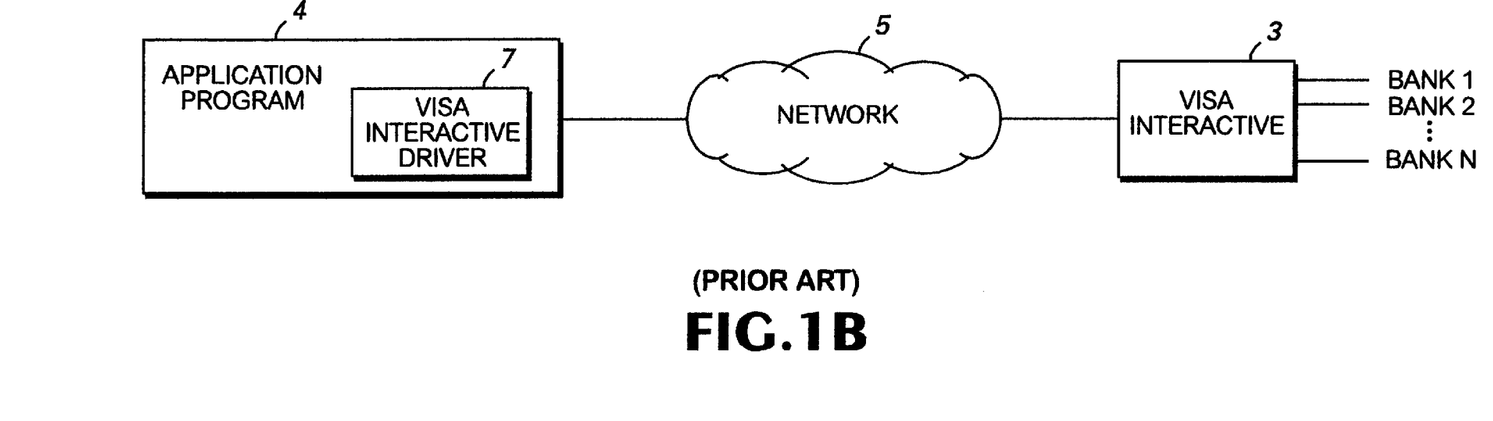

FIGS. 1A and 1B are block diagrams showing the implementation of on-line banking services using the ISC and Visa Interactive service providers 2 and 3, respectively. An application program 4 connects to a service provider by calling a local node of a wide area network 5 which is connected to the service provider. For example, FIG. 1A shows how the application program 4 connects to the ISC service provider 2 using ISC driver 6 within the application program to access on-line services at various banks connected to the service provider. Similarly, FIG. 1B shows how the application program 4 connects to the Visa Interactive service provider 3 using the Visa Interactive driver 7 within the application program. The driver would be loaded by the application program when the application program desires to use the service provider to connect to one of the various banks.

As is well known to those skilled in the art, a driver is a program that communicates with another device to control or regulate the other device. A driver may reside in an application program or operating system to control a particular device, such as a printer, disk drive, or other types of devices. In many cases, a driver may also manipulate the hardware of the system to transmit data to and from a device. The term "driver", as used herein, refers to a program within an application program to control communications with a service provider, a financial institution's computer, and/or other devices and networks to support the use of on-line services.

One problem associated with on-line banking services is that the ISC and Visa Interactive service providers (as well as the BTX and Minitel service providers) each have unique protocols and rules of operation that are determined by the service provider rather than the banks. These protocols and rules may not be desirable to all banks that wish to support on-line services and, therefore, certain banks may decide against utilizing ISC or Visa Interactive as their service providers. In this case, a bank may be required to set up its own method of connection with an application program and may provide its own set of business rules that relate to how on-line banking services are performed.

An application program must have certain information to be able to connect to a financial institution that supports on-line services. Various methods may be used for providing an application program with this information. One method is to store information on product disks that are sold with the application program disks. These product disks are generally loaded onto the user's computer concurrently with the application program. However, the information relating to financial institutions is dynamic and changes often. For example, additional financial institutions may decide to support on-line services and/or change the connection method after the product disks have been shipped. Therefore, the financial institution information on product disks may quickly become out-of-date and inaccurate between the time the information is put on the disks and the time the user wishes to use the information to connect to a financial institution. Additionally, storing financial institution information on product disks and shipping these disks with the application program can result in increased costs and can require the user to devote storage space on the user's computer to store this information. Thus, it is disadvantageous to provide information regarding financial institutions on product disks.

Another method includes storing a single large database file on a server that includes a list of all participating financial institutions and corresponding connection methods associated with each financial institution. Upon request, the entire database file can then be downloaded to the user's computer and searched for information relating to a particular financial institution. However, it will be appreciated that the list of participating financial institutions and each institution's corresponding connection method can form a voluminous database. Because the HTTP protocol used in connection with web servers typically requires the downloading of entire files, this method is inefficient.

Another method includes using a script or other server-side intelligence to search a database file on a server for information regarding a specific financial institution that is of interest. However, this method has the disadvantage of requiring a development effort to create server-side intelligence that does not presently exist.

The large number of financial institutions that support on-line services can make the application program's job of connecting to any one of the institutions quite difficult. Therefore, a need exists for an interface that allows an application program to support the multiple formats that may be used in providing on-line banking services.

SUMMARY OF THE INVENTION

The present invention is directed to a method, system, and interface for establishing connections with financial institutions to utilize on-line services. The user, running an application program on a client computer, identifies a particular financial institution for which on-line services are desired, preferably by an RTN or BIN number associated with the particular institution. The application program sends a request to a branding server, preferably via the Internet, asking the branding server to look up information related to the particular financial institution identified by the user. It should be understood that the branding server stores various information relating to a plurality of financial institutions. The branding server executes the request and, if the branding server contains information relating to the identified financial institution, the branding server sends such information to the application program.

The information sent by the branding server to the application program includes technical information relating to the method of connection with the financial institution's computer, such as whether the connection is via a particular service provider such as ISC or Visa Interactive, or via a direct connection to the bank through a private dial-up network, as well as the network address of the financial institution's server. The information also includes "branding information" that includes information such as the financial institution's name, logo, and e-mail address.

The application program then loads one of a plurality of drivers, the driver corresponding to the method of connection as determined by the branding server. For example, if the connection method utilizes the ISC or Visa Interactive service providers, the application program loads the ISC or Visa Interactive driver, respectively. If the method of connection does not utilize the ISC or Visa Interactive service providers, then the application loads a flexible driver, called the "OFC driver", which causes the application program to request the business rules of the particular financial institution from the financial institution's server because the business rules of each financial institution are not known by the OFC driver. The bank server then transmits the business rules relating to the particular bank to the OFC driver and the OFC driver incorporates the business rules into the application program software and reconfigures the application program to operate according to the business rules. The business rules are stored by the driver such that when the user subsequently utilizes the on-line services of the financial institution, the application will already have access to the business rules for that institution.

The application program establishes a connection between the client computer and the appropriate bank server via the Internet, or directly with the bank server via a private dial-up network, depending on the method of connection required by the bank and the network address of the bank server, as identified by the branding server.

DETAILED DESCRIPTION

The present invention is directed to a method and system for providing an application program interface for supporting multiple formats for on-line banking services. The preferred embodiment of the present invention is directed to a flexible driver that allows an application program running on a client computer to connect to a number of alternative service providers and financial institutions to support on-line services.

Although the preferred embodiment will be generally described in the context of an application program and an operating system running on a personal computer, those skilled in the art will recognize that the present invention also can be implemented in conjunction with other program modules for other types of computers. Furthermore, those skilled in the art will recognize that the present invention may be implemented in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

The processes and operations performed by the computer include the manipulation of data bits by a local processing unit or remote server and the maintenance of these bits within data structures resident in one or more of the local or remote memory storage devices. These data structures impose a physical organization upon the collection of data bits stored within a memory storage device and represent specific electrical or magnetic elements. Symbolic representations are the means used by those skilled in the art of computer programming and computer construction to most effectively convey teachings and discoveries to others skilled in the art.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Figure 2:
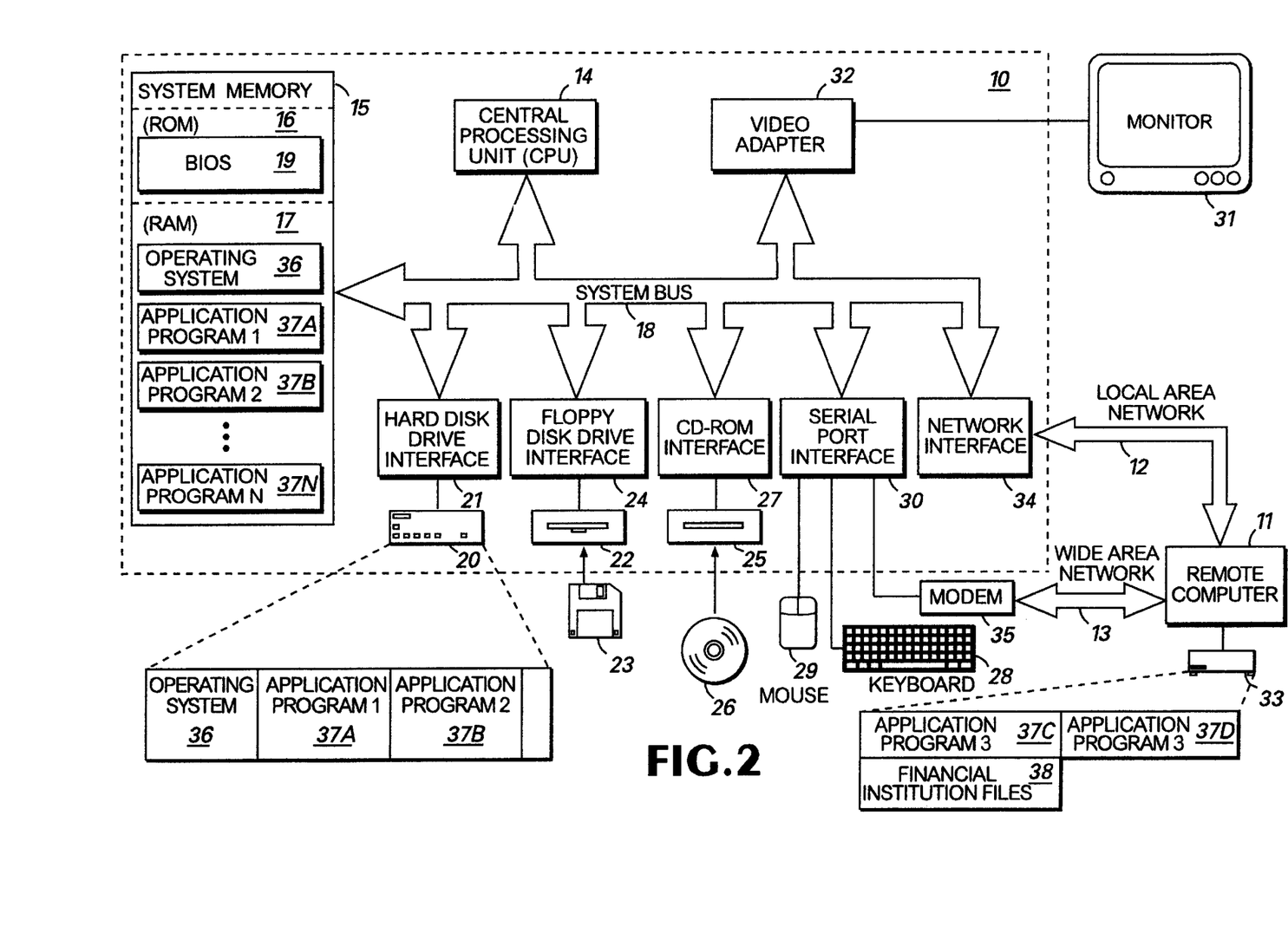
FIG. 2 is a first block diagram of a computer system representing the operating environment for a preferred embodiment of the present invention.

Turning now to the drawings, in which like numerals indicate like elements throughout the several figures, FIG. 2 illustrates a computer system on which the preferred embodiment of the present invention is implemented. As shown in FIG. 2, the computer 10 is in a networked environment with logical connections to a remote computer I11. The logical connections between the computer 10 and the remote computer 11 are represented by a local area network 12 and a wide area network 13. Those of ordinary skill in the art will recognize that in this client/server configuration, the remote computer 11 may function as a file server or computer server.

The computer 10 includes a central processing unit 14, such as the 80486 or "PENTIUM" microprocessors manufactured by Intel Corporation of Santa Clara, California. The processing unit 14 is not limited to an Intel-model processor, and can be implemented by other processors such as a member of the MIPS family by Silicon Graphics, Inc. or a PowerPC processor by Motorola Corporation. The computer also includes system memory 15, including read only memory (ROM) 16 and random access memory (RAM) 17, connected to the processing unit by the system bus 18. The BIOS 19 for the computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or pointing device, such as a mouse 29, which are connected to the system bus 18 via a serial port interface 30. Other types of pointing devices may include track pads, track balls, data gloves, head-trackers, pens, and other devices suitable for positioning a cursor on a computer monitor 31. The computer monitor 31 includes a pixel-oriented computer screen 31a on which images are displayed. The monitor 31 or other kind of display device is connected to the system bus 18 via a video adapter 32.

The remote computer 11 in the networked environment shown in FIG. 1 is connected to a remote memory storage device 33. This remote memory storage device 33 is typically a large capacity device such as a hard disk drive, CD-ROM drive, magneto-optical drive or the like. In accordance with the present invention, the remote memory storage device 33 may be called the branding and directory server (hereinafter, the "branding server") that stores files 38 associated with specific financial institutions. These files 38 contain information relating to particular financial institutions, as will be described further below.

The computer 10 is connected to the remote computer 11 by a network interface 34, which is used to communicate over the local area network 12. As shown in FIG. 2, the computer 10 may also be connected to the remote computer 11 by a modem 35, which is used to communicate over the wide area network 13, such as the Internet. The modem 35 is connected to the system bus 18 via the serial port interface 30. Typically, the modem 35 is also connected to a communications network such as the public switched telephone network (PSTN) or a community antenna television network (CATV). Although illustrated in FIG. 2 as external to the computer 10, those of ordinary skill in the art will recognize that a modem 35 may also be internal to the computer 10, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such components and the interconnection between them are well known. Accordingly, additional details concerning the internal construction of the computer 10 need not be disclosed in connection with the present invention. It should also be understood that the components and operation of computer 10, as described in FIG. 2, may also be provided within remote computer 11.

Those skilled in the art will understand that program modules such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs. The program module or application programs 37 preferably include a program that supports on-line banking services.

In accordance with the preferred embodiment of the present invention, a user can cause computer 10 to run an application program that supports on-line banking services between a financial institution and the computer 10. It should be noted that the present invention is not limited merely to online services relating to banking, but can be adapted to be implemented in a wide range of on-line services in many different fields.

Figure 3:
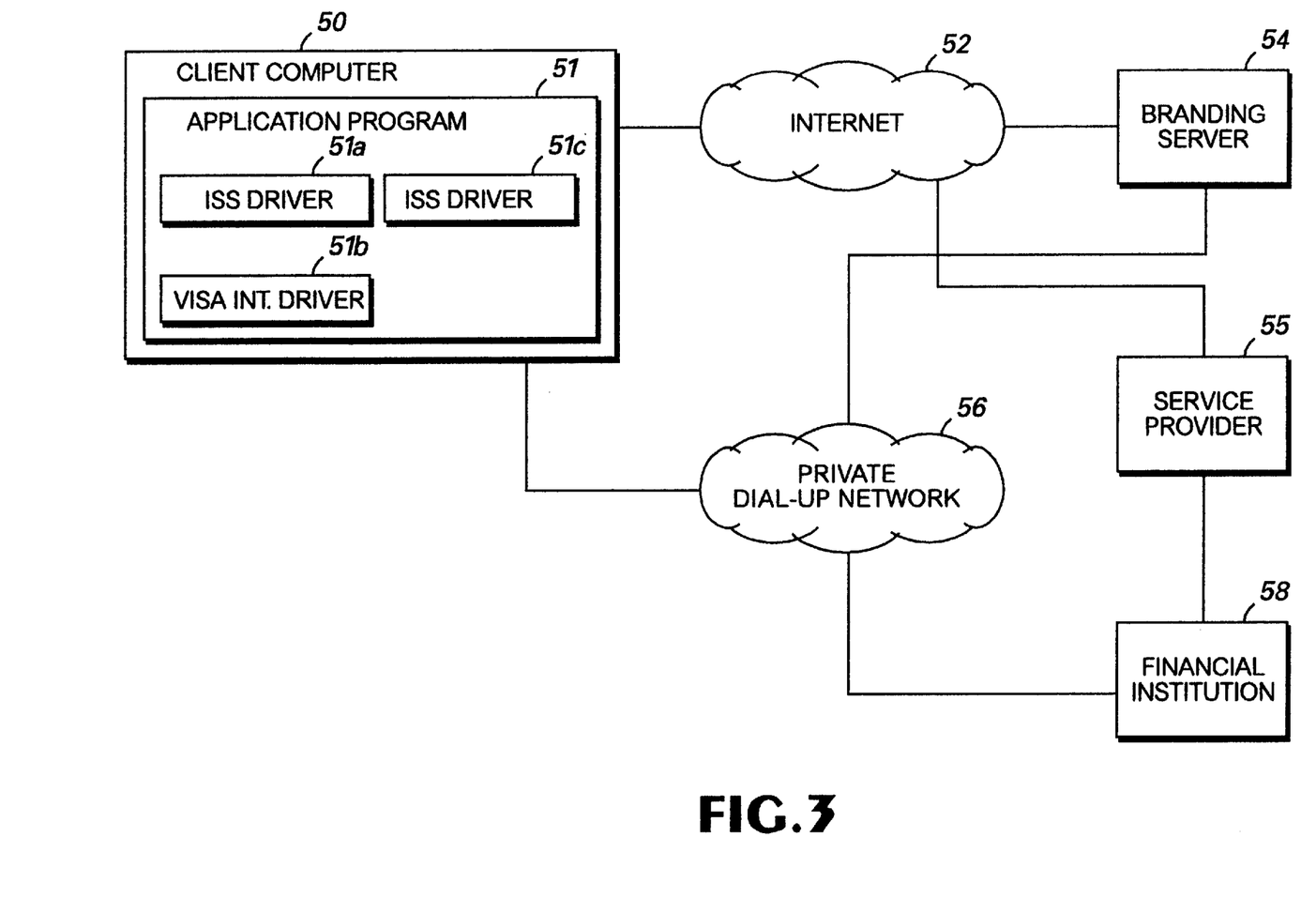
FIG. 3 is a second block diagram of a distributed computer network representing the operating environment for the preferred embodiment of the present invention.

FIG. 3 is a block diagram showing the distributed network environment in which the present invention is implemented. The client computer 50, which corresponds to computer 10 in FIG. 2, is running an application program that supports on-line banking services. The client 50 is connected to a branding server 54, preferably via the Internet 52. The branding server 54, which may correspond to remote computer 11 and remote memory storage device 33 in FIG. 2, stores files containing information relating to a plurality of financial institutions. The client computer 50 may be connected to one of a number of financial institutions 58 via a particular service provider 55.

The branding server 54 is preferably implemented as a web server using the HTTP protocol to leverage the tools of operating systems, such as Microsoft WINDOWS, which provide easy use and interaction with web servers. However, the present invention is not limited merely to such a server and is envisioned to be useful for any server that can be accessed by a client computer. The client computer 50 can also be connected to a computer associated with a financial institution 58 via a service provider through the Internet 52 or directly via a private dial-up network 56 to permit the user to utilize on-line banking services provided by the financial institution.

The files stored on the branding server 54 pertain to many different financial institutions that support on-line services. One method of storing and searching for files and information related to financial institutions on a server is described in U.S. Patent Application Ser. No. 08/671,771 entitled "Method and System for Creating and Searching Directories on a Server", filed on Jun. 28, 1996, which is hereby incorporated by reference. In accordance with the present invention, the branding server 54 stores a file for each financial institution based on the financial institution's routing in transit number (RTN) or bank identification number (BIN). The RTN, which is used in the check-clearing process and uniquely identifies a financial institution, comprises a nine digit number printed on the bottom left portion of checks. The BIN is used for credit card clearing and comprises the first six numbers of a credit card number. As with an RTN, a BIN uniquely identifies a particular financial institution. Although each RTN and BIN identifies a single financial institution, a single financial institution may have multiple RTNs and BINs associated with it.

The creation and storage of files containing information relating to financial institutions on the branding server 54 in the manner described herein provides advantages over other existing methods of providing financial institution information. As stated above, one existing method is where the application program itself provides a list of the different financial institutions that support on-line services. The user of the application program can then view the list of financial institutions as part of the application program and select a particular institution. This prior method is undesirable because some financial institutions may not like for users of the application program to view the list in which other competitor institutions appear. These financial institutions may wish that the user select a particular predetermined institution without viewing a list of viable alternative institutions.

The present invention allows users to accomplish the above-identified objective by providing a directory service in the form of the branding server which identifies files and information relating to financial institutions based on an RTN and/or BIN for each particular institution. The use of a branding server allows the user to enter the RTN or BIN of a predetermined financial institution into the application program, which then causes the branding server to be searched to determine if any information related to the institution associated with the entered RTN or BIN is available. In this manner, the user selects a financial institution based on that particular institution's RTN or BIN, and the user does not view a list of alternative institutions. Not only may this be desirable to financial institutions that do not want users to view a list of alternative institutions, but it is also advantageous to application program manufacturers because a long list of financial institutions need not be provided to the user, thus saving disk storage space. Rather, the identity of the financial institutions that support on-line services is maintained on the branding server.

As stated above, the branding server 54 stores files containing information relating to particular financial institutions. This information is accessed by an application program on the client computer 50, to support the configuration of the application program to utilize a financial institution's on-line services.

For example, the application program may allow the client computer 50 to connect to the branding server 54 through a private dial-up network 56 running the Point-to-Point protocol. The private dial-up network 56 may run the TCP/IP, HTTP, and PCT or SSL protocol, as is well known to those skilled in the art. The application program may also allow the client computer 50 to connect to the branding server 54 through the Internet 52 using Internet access software typically provided in the software within the operating system running on the user's computer, such as Microsoft WINDOWS.

There are different ways of connecting to service providers and financial institutions, including the ISC and Visa Interactive protocols described above. In accordance with the present invention, FIG. 3 shows the application program 51 running on the client computer. One aspect of the present invention is the inclusion of multiple drivers in the application program that provide the application program with the capability to connect to many financial institutions using a wide variety of connection methods. As seen in FIG. 3, the application program 51 includes multiple driver including an ISC driver 51a, a Visa Interactive driver 51b, and a flexible driver, i.e., the OFC driver 51c for controlling the connections with various financial institutions via different service providers. Thus, the multiple drivers used in accordance with the present invention provides the application program with the flexibility to connect to different financial institutions regardless of whether different service providers are used.

As used herein, the acronym "OFC" stands for "open financial connectivity", which refers to the ability to utilize different service providers for connecting to various financial institutions for establishing on-line services. The flexible driver is called the "OFC driver" because it allows the application program to establish a connection with a particular financial institution using the connection method specified by the institution. Thus, the application program can connect to a financial institution that does not utilize the ISC or Visa Interactive service providers.

It should be understood from the description herein that "OFC" refers merely to the utilization of different connection methods and service providers for providing online services and therefore the description of the present invention in terms of "OFC" should not be construed to be limiting. Rather, the present invention should be understood to include an application program that includes any driver which permits the application program to establish a connection with a financial institution for providing on-line services.

The application program loads the appropriate driver depending on the particular financial institution for which on-line services are desired and the manner in which the application program must connect to that institution. It should be understood that the drivers identified above are examples of several drivers used in connection with the application program, and that other drivers that perform similar functions may be used. Thus, the invention should not be understood to be limited only to those drivers shown in FIG. 3. Although the description of the current invention herein refers to the ISC driver, Visa Interactive driver, and the OFC driver, it should be understood that the present invention may also include a BTX driver and a Minitel driver to allow the application program to establish a connection with financial institutions in Germany and France, respectively. The use of such drivers and other drivers in accordance with the invention will be apparent from the description provided herein. In this manner, the present invention allows the application program to establish a connection with any financial institution that supports on-line services regardless of the service provider of method of connection utilized by the institution by loading an appropriate one of a plurality of drivers. This is much more beneficial and flexible as compared to prior methods, as shown in FIGS. 1A and 1B, which included only a single driver which supported only a single service provider and method of connection.

Figure 4:
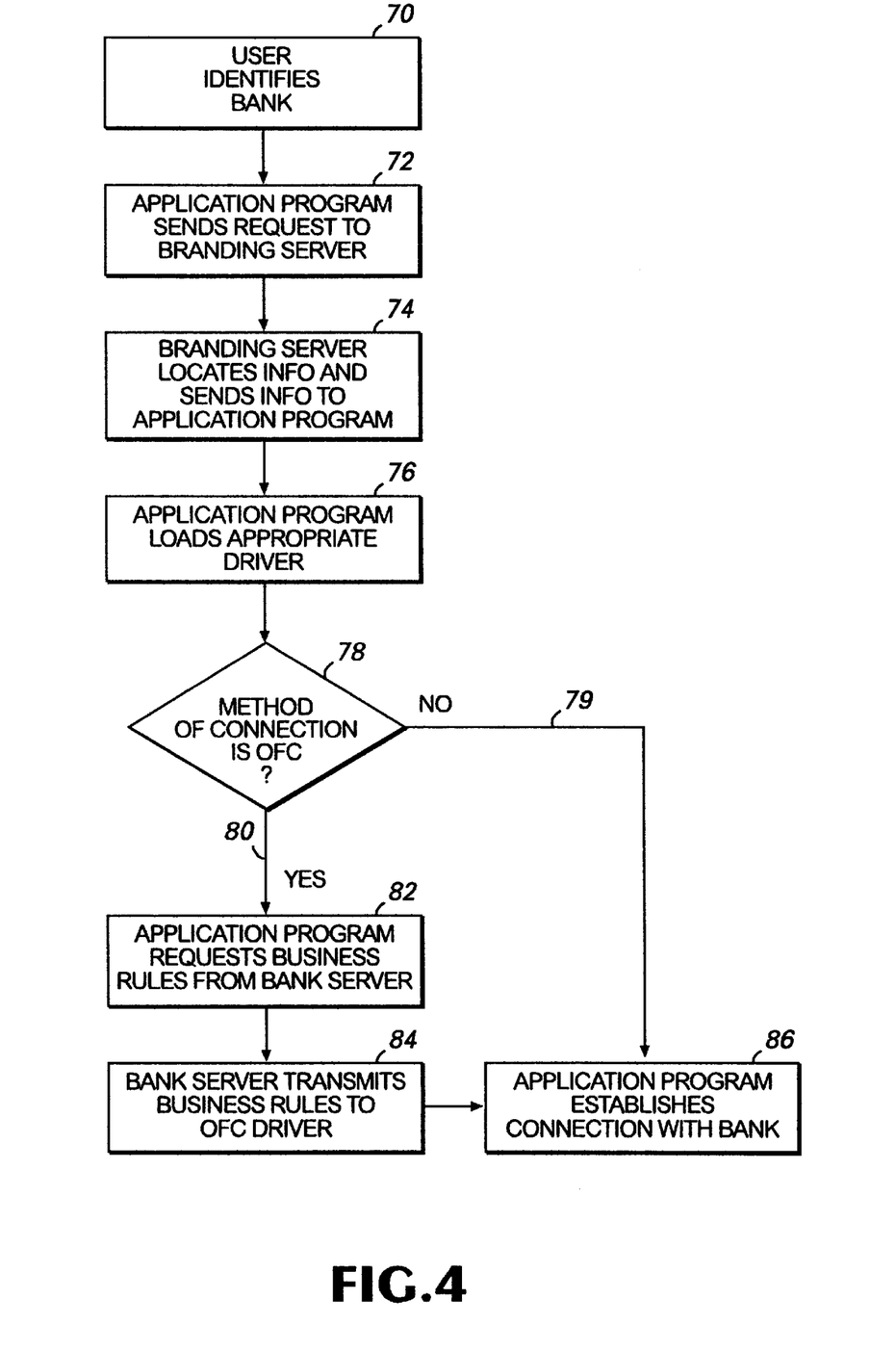
FIG. 4 is a flow chart illustrating the method of establishing a connection between a client computer and a financial institution's server, in accordance with the preferred embodiment of the present invention.

The method of connection between the application program and the financial institution is described below with reference to the flow chart of FIG. 4. When the user of the application program desires to utilize the on-line services of a financial institution, the application program will prompt the user to identify a particular financial institution or bank of interest. The user identifies the particular bank, preferably by the bank's RTN or BIN, at step 70. It should be understood that the bank may also be identified by its name or by any other suitable identifying means. At step 72, the application program sends a request to the branding server, via the Internet, asking the branding server to look up that particular financial institution based on the user-identified RTN or BIN. As described, the branding server includes various information relating to a plurality of financial institutions. At step 74, the branding server executes the request and, if the branding server locates information relating to the identified financial institution, the branding server sends the information to the application program.

The information sent by the branding server to the application program includes an "access description" that includes technical information relating to the method of connection with the bank's server, such as whether the connection is via ISC, Visa Interactive, or OFC and whether the bank server is accessed via the Internet or a private dial-up network. If the bank can be accessed through the Internet, the access description will also include a URL for the bank's server. The information sent by the branding server may also include "branding information", such as the financial institution's name, logo, and e-mail address.

At step 76, the application program loads the appropriate driver, i.e., either the ISC, Visa Interactive, OFC driver, or other drivers, depending on the method of connection as determined by the branding server. At step 78, it is determined whether the method of connection is OFC. It should be understood that for the purposes of this discussion the connection method is deemed to be OFC when such connection method is not via ISC, Visa Interactive, or any other service provider for which a corresponding driver is included in the application program. If the method of connection is OFC, the method follows "yes" branch 80 to step 82.

At step 82, the OFC driver in the application program requests the business rules of the particular financial institution from the financial institution's server. Business rules are the way in which the financial institution handles online transactions. For example, one business rule may relate to the time at which bills are paid. The on-line services of one financial institution may pay a bill on the day that the bill is due while another financial institution may pay the bill several days before it is due. Another example of a business rule may relate to the maximum amount of money that may be transferred in one transaction or over a predetermined period of time. It should be understood that there are many different possible business rules that are peculiar to each financial institution. Therefore, the application program must be made aware of the business rules of each financial institution with which on-line services are utilized.

It should also be understood that the business rules of each financial institution are not known by the OFC driver in the application program because the OFC driver is designed to work with a large and dynamic set of providers and institutions such that providing the business rules of each institution is impractical. Therefore, the OFC driver must be made aware of the business rules of a given financial institution from the bank's server when the OFC driver connects to that server for the first time.

Although the OFC driver must be made aware of the business rules of a given financial institution, it should be understood that initial settings for the business rules are obtained from the branding server so that the application program can operate properly prior to the initial connection to the bank server.

After the OFC driver in the application program connects to the bank server and requests the business rules at step 82, the bank server transmits the business rules relating to the particular bank to the OFC driver at step 84. The OFC driver then incorporates the business rules into the application program software and reconfigures the application program to operate according to the business rules. It should be understood that the mechanism used by the OFC driver to reconfigure the application program in accordance with the business rules is the same as that used by the ISC and Visa Interactive drivers to reconfigure the application program. However, in the ISC and Visa Interactive drivers, the business rules are hard-coded in each respective driver, whereas in the OFC driver the business rules are downloaded from the bank server.

Business rules are explained further below. One of the on-line services that may be offered by application programs is electronic bill payment. In the electronic bill payment feature, the user typically enters payment instructions in the application program and the application program then sends the user's instructions to the financial institution to be processed. Dates are an important concern in connection with electronic bill payment. Typically, the three dates that are of primary importance are the date the bill is due (the due date), the date the user's instructions are sent to the financial institution (the send date), and the date funds are withdrawn from the user's account to make the payment (the withdrawal date).

Financial institutions may have different rules regarding the relationships of these dates. For example, a financial institution may define a period by which the send date must precede the due date based on the time required for the financial institution to execute the user's instructions. If the application program is aware of the rules regarding these dates for each particular financial institution, the application can help the user avoid sending an instruction to the financial institution which will be rejected because it too close in time to the due date.

Similarly, a financial institution may have a rule which defines a period by which the withdrawal date will precede the due date. By knowing this period, and therefore knowing the exact date on which funds are to be withdrawn to pay the bill, the application program can provide the user with precise information regarding the timing of cash flow in the user's account. A financial institution may also have other business rules associated with its on-line services.

The business rules pertaining to a particular financial institution are stored by the appropriate driver. The application program obtains the rules by loading the appropriate driver and sending an appropriate request to the driver. For drivers such as ISC and Visa Interactive, the business rules are the same for all financial institutions that use ISC and Visa Interactive service providers, and the rules are hard-coded into each respective driver. Financial institutions that do not utilize ISC or Visa Interactive may have their own rules which may vary for each financial institution. The OFC driver is used by the application program for the financial institutions that do not use ISC or Visa Interactive. The business rules of such institutions are obtained and stored by the OFC driver and are returned to the application program when requested.

Returning to the discussions of the flow chart of FIG. 4, the business rules are stored by the driver such that when the user subsequently utilizes the on-line services of that particular financial institution, the application will already know the business rules for that institution and will not have to perform steps 82 and 84 for subsequent connections to the institution. It should be understood that if the method of connection is not OFC, i.e., the method of connection is ISC or Visa Interactive, then the business rules for these providers and the proprietary protocols are included within the ISC and Visa Interactive drivers, respectively, in the application program.

If the method of connection is not OFC, the program follows "no" branch 79 directly to step 86. At step 86, the application program establishes a connection with the appropriate service provider via the Internet, or directly with the bank server via a private dial-up network, depending on the method of connection required by the bank as identified by the branding server.

From the foregoing, it will be appreciated that the disclosed embodiment of the present invention overcomes the drawbacks of the prior art described hereinabove. From the description of the disclosed embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for connecting an application program running on a client computer to a server associated with a financial institution in connection with on-line services offered by the financial institution, comprising the steps of:

identifying a particular financial institution by an RTN or BIN associated with the institution;

sending a query for information relating to the method of connecting to the server associated with the identified financial institution from the client computer to a branding server storing a plurality of connection information sets;

determining which one of the plurality of connection information sets corresponds to the financial institution;

transmitting the connection information set corresponding to the financial institution to the client computer; and establishing a connection between the client computer and the server associated with the financial institution based on the connection information set.

2. A method for establishing on-line services between an application program running on a client computer and a server associated with a financial institution, comprising the steps of:

determining the method of connection required by the server associated with the financial institution;

loading one of a plurality of drivers in the application program associated with the determined method of connection;

transferring one of a plurality of instruction sets governing the manner in which financial transactions are received, posted, and transacted with the financial institution associated with the on-line services, from a branding server storing connection information and the plurality of instruction sets for a variety of financial institutions for information relating to the method of connecting, to the server associated with the identified financial institution to the loaded driver;

establishing a connection between the client computer and the server associated with the financial institution; and using the instruction set to configure the application program to utilize the on-line services offered by the financial institution.

3. A method for connecting an application program running on a client computer to a server associated with a financial institution in connection with on-line services offered by the financial institution, comprising the steps of:

identifying a particular financial institution;

transmitting a request from the client computer to a branding server storing connection information and a plurality of instruction sets for a variety of financial institutions for information relating to the method of connecting to the server associated with the identified financial institution;

in response to transmitting the request, obtaining information relating to the method of connecting to the server associated with the identified financial institution from the branding server;

in response to obtaining connection information, loading one of a plurality of drivers in the application program, each driver being associated with a method of connecting;

obtaining one of the plurality of instruction sets governing the manner in which financial transactions are received, posted, and transacted with the financial institution associated with the on-line services from the branding server;

establishing a connection between the client computer and the server associated with the financial institution; and using the information and the instruction set to configure the application program to utilize the on-line services offered by the financial institution.

4. The method of claim 3 wherein the connection in step (e) is established via the Internet.

5. The method of claim 3 wherein the connection in step (e) is established via a private dial-up network.

6. The method of claim 3 wherein the server associated with the financial institution is operated by a service provider.

7. The method of claim 6 wherein the service provider is ISC, and the application program includes an ISC driver including the business rules for operating with the ISC service provider.

8. The method of claim 6 wherein the service provider is Visa Interactive, and the application program includes a Visa Interactive driver including the business rules for operating with the Visa Interactive service provider.

9. The method of claim 6 wherein the service provider is BTX, and the application program includes a BTX driver including the business rules for operating with the BTX service provider.

10. The method of claim 6 wherein the service provider is Minitel, and the application program includes a Minitel driver including the business rules for operating with he Minitel service provider.

11. The method of claim 3 wherein the information is obtained from a branding server.

12. The method of claim 11 wherein the branding server includes branding information relating to each financial institution.

13. The method of claim 3 wherein the loaded driver stores the business rules for the particular financial institution.

14. The method of claim 3 wherein the business rules are obtained from the server associated with the financial institution.

15. A computer system including a client computer operative to run an application program for allowing the client to connect to a server associated with a financial institution to utilize the on-line services of the financial institution, comprising:

a memory for storing the application program;

a processing device, responsive to instructions from the application program, operative to:

transmit, in response to input from a user of the client computer, a request for information relating to the method of connecting to a particular financial institution to a branding server storing connection information and a plurality of instruction sets for a variety of financial institutions for information relating to the method of connecting to the server associated with the identified financial institution;

receive the requested information from the branding server;

select a driver associated with the requested information from a plurality of drivers, each driver corresponding to a different method of connecting;

load the selected driver in the application program;

obtain an instruction set governing the manner in which financial transactions are regulated with the financial institution associated with the on-line services;

establish a connection between the client computer and the server associated with the financial institution; and use the information and instruction set to configure the application program to utilize the on-line services offered by the financial institution.

16. The system of claim 15 wherein the connection between the client computer and the server associated with the financial institution is established via the Internet.

17. The system of claim 15 wherein the connection between the client computer and the server associated with the financial institution is established via a private dial-up network.

18. The system of claim 15 wherein the server associated with the financial institution is operated by a service provider.

19. The system of claim 18 wherein the service provider is ISC, and the application program includes an ISC driver including the business rules for operating with the ISC service provider.

20. The system of claim 18 wherein the service provider is Visa Interactive, and the application program includes a driver including the business rules for operating with the Visa Interactive service provider.

21. The system of claim 18 wherein the service provider is BTX, and the application program includes an BTX driver including the business rules for operating with the BTX service provider.

22. The system of claim 18 wherein the service provider is Minitel, and the application program includes an Minitel driver including the business rules for operating with the Minitel service provider.

23. The system of claim 15 wherein the business rules are obtained from the server associated with the financial institution and the business rules are stored by a driver in the application program.

24. A computer-readable medium on which is stored an application program for allowing a client computer to utilize the on-line services of a financial institution, the application program comprising instructions which, when executed by the client computer, perform the steps of:

(a) identifying a particular financial institution;

(b) obtaining from a branding server information relating to the method of connecting to a server associated with the identified financial institution;

(c) loading one of a plurality of drivers in the application program, each driver being associated with a method of connecting;

(d) obtaining business rules associated with the on-line services;

(e) establishing a connection between the client computer and the server associated with the financial institution; and (f) the driver using the information and business rules to configure the application program to utilize the on-line services offered by the financial institution.

25. The medium of claim 24 wherein the connection in step (e) is established via the Internet.

26. The medium of claim 24 wherein the connection in step (e) is established via a private dial-up network.

27. The medium of claim 24 wherein the server associated with the financial institution is operated by a service provider.

28. The medium of claim 27 wherein the service provider is ISC, and the application program includes an ISC driver including the business rules for operating with the ISC service provider.

29. The medium of claim 27 wherein the service provider is Visa Interactive, and the application program includes a Visa Interactive driver including the business rules for operating with the Visa Interactive service provider.

30. The medium of claim 27 wherein the service provider is BTX, and the application program includes an BTX driver including the business rules for operating with the BTX service provider.

31. The medium of claim 27 wherein the service provider is Minitel, and the application program includes an Minitel driver including the business rules for operating with the Minitel service provider.

32. The medium of claim 24 wherein the branding server includes branding information relating to each financial institution.

33. The medium of claim 24 wherein the business rules are obtained from the server associated with the financial institution and the business rules are stored by a driver in the application program.

\* \* \* \* \*